W. H. STANTON.
FURNACE FOR PRODUCING SILICATE OF SODA AND THE LIKE.
APPLICATION FILED AUG. 9, 1920.
1,425,551. Patented Aug. 15, 1922.
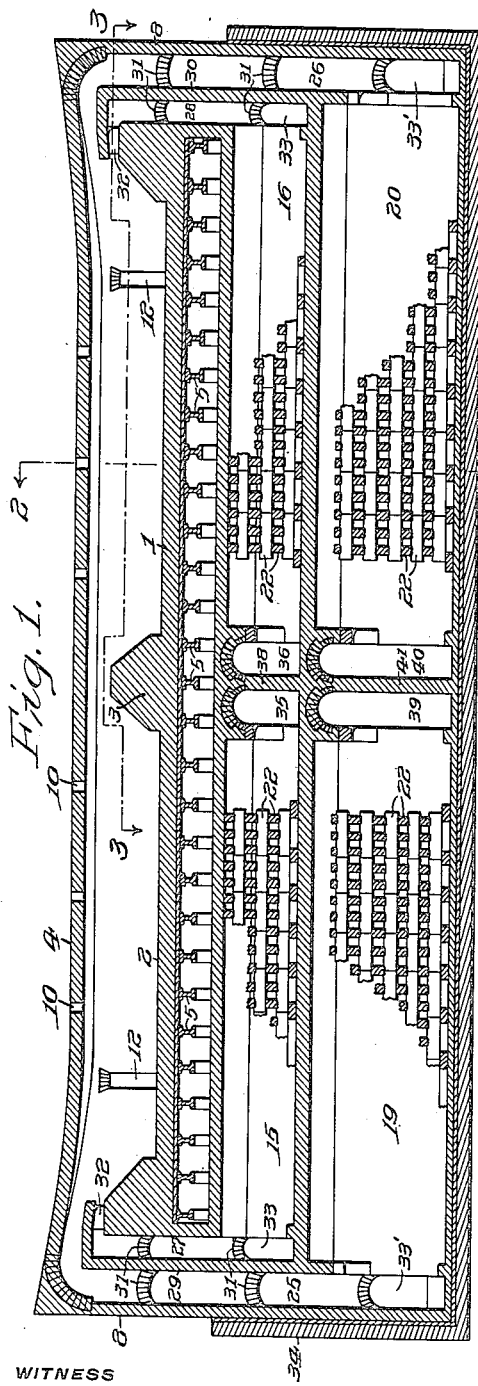
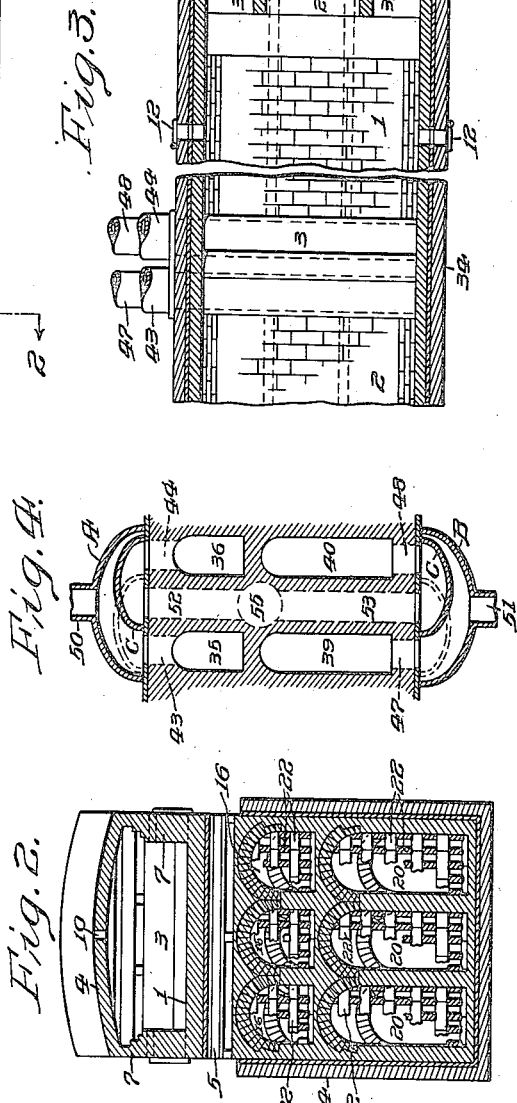
INVENTOR
William H. Stanton.
WITNESS

UNITED STATES PATENT OFFICE.

WILLIAM H. STANTON, OF RIDLEY PARK, PENNSYLVANIA.

FURNACE FOR PRODUCING SILICATE OF SODA AND THE LIKE.

1,425,551.  Specification of Letters Patent.  Patented Aug. 15, 1922.

Application filed August 9, 1920. Serial No. 402,284.

*To all whom it may concern:*

Be it known that I, WILLIAM H. STANTON, a citizen of the United States, and a resident of Ridley Park, county of Delaware, and State of Pennsylvania, have invented a new and useful Furnace for Producing Silicate of Soda and the like, of which the following is a specification, reference being had to the accompanying drawing.

My invention more especially relates to furnaces adapted for melting glass, silicate of soda, silicate of potash or substantially similar materials, and for fusing together the ingredients from which these materials are ordinarily made, and a principal object of my invention is to provide a furnace of novel construction and arrangement which may be conveniently, economically and satisfactorily employed for the purpose aforesaid, and by the operation thereof a more uniform and satisfactory heating and fusion of the materials is obtained.

My invention further includes all of the other various novel objects, operations and features of construction and arrangement hereinafter more specifically referred to and described.

In the accompanying drawing I have illustrated one form of my improved furnace, Fig. 1 being a central, vertical longitudinal section thereof; Fig. 2, a vertical, transverse section taken on line 2—2 in Fig. 1; Fig. 3, a horizontal transverse section taken on line 3—3 in Fig. 1 and Fig. 4 a fragmentary diagrammatic view illustrating a convenient arrangement of the valves by means of which the operation of the furnace is controlled.

My invention comprises a furnace employing a pair of similar melting hearths separated by a suitable bridge wall and embodying means whereby either hearth, or the material thereon, may alternately be heated at maximum temperature and the other hearth, or the material thereon, simultaneously heated at a relatively reduced temperature, so that while the charge of material on one of the hearths is being subjected to the action of the burning gases at substantially their maximum temperature of combustion, a charge of material on the other hearth may be gradually raised from a cold state to a temperature at which the gases burning at maximum temperature may be economically directed upon it for its final heating after the completion of the treatment of the first charge and ensuing reversal of the direction of the passage of the burning gases through the furnace. More specifically, the form of furnace shown in the drawing comprises a pair of hearths 1 and 2 separated by a transversely extending bridge wall 3, the hearths being supported at a suitable distance beneath the roof 4, preferably upon transversely extending beams 5 or in any other suitable manner. The furnace is provided with side walls 7, 7 and end walls 8, 8 in the ordinary manner and the roof of the furnace above the hearths is preferably slightly transversely arched and also inclined downwardly from its ends toward the middle whereby the incoming burning gases are directed downwardly towards the hearth adjacent their point of entry to contact with the material thereon. The roof of the furnace may be provided with a plurality of suitable charging apertures 10, and one or more suitable doors 12 are provided adjacent each hearth through which the charge may be withdrawn after melting.

Beneath each hearth are located regenerator chambers extending longitudinally of the furnace, the chamber or chambers 15, 16 directly beneath the hearths being preferably designed to alternately receive the fresh incoming gas as hereinafter described, and the chamber or chambers 19, 20 at the lowest part of the furnace and most distantly removed from the hearths being preferably adapted for the alternate reception of the fresh incoming air. The several chambers may preferably consist of a plurality of longitudinally extending passages having arched roofs, as shown in the drawing, or may be of any other form suitable for accomplishing the results desired, the several chambers being provided with suitable checkers 22 preferably composed of suitably arranged brick-work in the ordinary manner.

From a point adjacent the outer extremity of each of the air regenerator chambers 19, 20, suitable flues 25 and 26 lead respectively upwardly toward the roof 4, each flue being preferably substantially of the maximum width permissible between the side walls of the furnace, and from the outer extremity of each of the gas regenerator chambers 15, 16 corresponding flues 27 and 28 also extend upwardly toward the furnace roof, vertical walls 29 and 30 braced, if desired by arches 31, serving to separate each adjacent set of flues, and the upper end of each wall being deflected inwardly and suitably supported on piers 32, as best shown in Fig. 1, so that the ascending columns of gas and air are prevented from uniting until they issue from their respective ports adjacent the outer extremities of the hearths. Suitable doors 33 may be provided in the walls of the furnace through which access may be had when desired to the gas regenerator chambers and their respective flues, and similar doors 33' arranged to give access to the air regenerator chambers and their respective flues. If desired, that portion of the furnace containing the regenerators may be surrounded with suitable insulation 34.

For the purpose of conducting the fresh gas to, and a portion of the burned gases from, the gas regenerator chambers 15, 16 transversely extending passages 35 and 36 are provided preferably adjacent the inner extremities of the chambers and communicating therewith, these passages being separated by a transversely extending wall 38, and for the purpose of conducting the fresh air to, and a portion of the burned gases from, the air regenerator chambers 19, 20 corresponding passages 39 and 40, separated by a transversely extending wall 41, are arranged preferably beneath passages 35 and 36, the gas passages being separately connected by suitable flues 43, 44 with a suitable gas valve A by means of which the flow of the fresh and burned gases through these flues may be controlled, and the air passages being separately connected by suitable flues 47, 48 with a suitable air valve B, by means of which the flow of the fresh air and burned gases through these flues may be controlled, a preferred arrangement of the several flues, passages and valves being diagrammatically shown in Fig. 4. It will be understood that the valves A and B are connected respectively with the sources of gas and air supply by conduits 50 and 51, and also communicate, by suitable passages 52 and 53, with a chimney or stack 55 or other means for creating a draft through the furnace and carrying off the burned gases therefrom.

While the valves A and B may be of any suitable construction, those diagrammatically shown in Fig. 4, each comprise a stationary outer casing and an internal movable member or "turtleback" C, by the movement of which communication can be established as desired between either of the flues leading to the respective valves from passages 35, 36 and 39, 40 and the conduit leading from that valve to the chimney, while the other flue leading from the passages to that valve is left open to receive the fresh incoming air or gas from the source of supply, the arrangement of the valves and passages for effecting these results being well understood by those familiar with the art.

With the various parts constructed and arranged substantially as herein described, it will be evident that with the turtlebacks C in the positions shown in solid lines in Fig. 4, and fresh gas supplied to valve A will pass through flue 43 and passage 35 to the regenerator chamber 15, and from thence upwardly through flue 27 to a point above hearth 2. Simultaneously the fresh air entering valve B will pass through flue 47 and passage 39 to regenerator chamber 19, and flue 25 to unite with the entering gas adjacent the outer extremity of hearth 2. From this point the ignited mixture of air and gas passes over the hearth being deflected downwardly toward it or the charge thereon by the conformation of the furnace roof, thence over bridge wall 3, and traversing hearth 1 or the charge thereon, downwardly through flues 26 and 28 through the regenerator chambers 16 and 20, and from these chambers, through passages 36 and 40, and flues 44 and 48, to the undersides of the turtlebacks, and through conduits 52 and 53, to the chimney 55. It will furthermore be evident that if the turtlebacks, or other equivalent means in valves A and B, be moved to the position shown in dotted lines in Fig. 4, the direction of the flow of the gases through the furnace will be reversed so that the ignited mixture of air and gas will first be directed over hearth 1, and then, passing over the bridge wall and traversing hearth 2, will be conducted from the furnace through regenerator chambers 15 and 19 and their connecting passages and flues to the chimney 55.

In the melting or fusing of materials in reverberatory furnaces supplied with regenerators, it has been the practice to effect a reversal of the direction of the flow of the gases at relatively short intervals of time so that for each charge melted in the furnace a relatively large number of reversals are effected. This method of operation is open to numerous disadvantages, among which may be mentioned the great waste occasioned by the ejection or blowing out from the flues and regenerator chambers of the gases which have been drawn into them preparatory to combustion and with which they are filled, as well as the loss arising from the blowing out of the furnace of the gases burning in the hearth at substantially their maximum temperature so that at each interval of the furnace the heat units contained in the heated but unburned gases in one set of flues and regenerator chambers as well as those contained in the freshly ignited gases in the hearth are almost entirely wasted.

I have found that with a furnace, preferably substantially of the form of that herein described, the treatment of certain materials and more especially glass, and silicates of soda or potash, and the melting or fusion of the ingredients from which these materials are ordinarily formed, may be carried out much more economically and satisfactorily by only effecting a reversal of the flow of the gases each time that a new charge of material is introduced into the furnace, instead of effecting the reversal several times during the treatment of each charge. More specifically, when employing my preferred form of furnace with a charge of material on each hearth, I first arrange the valves, for example as shown in solid lines in Fig. 4, so that the incoming, intensely heated gases will be directed on the charge on hearth 2 to effect the maximum heating thereof, after which at relatively reduced temperatures they pass over the bridge wall to the charge on hearth 1 and gradually and uniformly raise the temperature thereof before passing through the regenerators 16 and 20 and delivering to the checkers therein a still further portion of their contained heat which I have found in practice to be amply sufficient heat to raise the checkers to the desired temperature, so that the gases are induced to give up a very large part of their contained heat before reaching the stack, thus materially enhancing the economy of operation. After the charge on hearth 2 has been melted and drawn, and a fresh charge introduced to that hearth, the direction of the flow of the gases is immediately reversed, so that they will be directed on the charge on hearth 1 at their maximum temperature. As this charge has already been raised to a relatively high temperature, the combustion of the gases is not retarded or interrupted as is the case when the burning gases are directed against a cold charge, but the maximum heating effect is immediately attained, and, in addition, the charge is heated more evenly and uniformly and with better results than when a cold charge is introduced to a very highly heated chamber in which the gases are burning at their maximum temperature pursuant to the ordinary practice. It will be understood that during the heating of the charge on hearth 1 the initially cold charge on hearth 2 is in turn being heated through the action of the gases carried over from hearth 1, and that after the charge on the latter hearth has been completely heated and drawn from the furnace, a fresh charge is introduced and the flow of the gases again immediately reversed so that the operation of melting the already heated charge on one hearth while a cold charge is being preheated on the other hearth may be carried on continuously.

It should be understood that the method or process which I have described cannot be satisfactorily employed with materials requiring a relatively long period of heating, but is adapted more especially to those classes of materials which can be completely heated or brought to the desired state in a period of substantially two hours or less, for I have found that good results cannot be obtained if the flow of the gases be continued in one direction for a greater time than approximately the period mentioned, and that in consequence the said process or method is, therefore, inapplicable to the production of iron and other metals or substances for which a relatively long period of heating is required.

While I have herein illustrated and described one preferred embodiment of my improved furnace with considerable particularity, and while I have found in practice that the same is capable of affording most satisfactory results, I do not intend or desire to limit myself specifically to the form of furnace which I have shown and described, as changes may be made in the details of construction and arrangement of the various parts thereof, as may be desired, and the process or method of operation which I have described may be varied in minor particulars, without departing from the spirit and scope of my invention as defined in the appended claims.

Having thus described my invention I claim and desire to protect by Letters Patent of the United States:

1. In a furnace the combination with a hearth disposed longitudinally thereof and a roof above said hearth, of a pair of gas regenerator chambers beneath said hearth extending longitudinally of said furnace, an air regenerator chamber beneath each of said regenerator chambers also extending longitudinally of the furnace, a flue leading from the outer extremity of each said regenerator chambers opening into the space between the superimposed hearth and the roof at a point adjacent an outer extremity of the hearth and operative to conduct gas from said chamber to said space, and separate passages communicating respectively with the inner end of each of said regenerator chambers operative to respectively conduct air or gas thereto and to conduct the spent gases of combustion therefrom.

2. In a furnace the combination with a hearth positioned longitudinally thereof and a roof above said hearth, of a pair of separate gas regenerator chambers beneath said hearth, an air regenerator chamber beneath each of said gas regenerator chambers, a flue leading from each of said gas and air regenerator chambers to a point adjacent an outer extremity of the superposed hearth, a plurality of separate passages extending transversely of the furnace, each of said passages being arranged to communicate respectively with the inner end of one of said regenerator chambers, means to separately supply air and gas to said passages and means operative to control the direction of the passage of air and gas through the furnace.

3. In a furnace, the combination with a double hearth, the sections of which are disposed consecutively longitudinally of the furnace, and a roof above said hearth, a pair of gas regenerator chambers each respectively beneath one of said sections of said hearth and extending longitudinally of said furnace, a pair of air regenerator chambers also extending longitudinally of said furnace and each respectively beneath one of the sections of said hearth, a flue leading from the outer extremity of each of said regenerator chambers opening into the space between the superposed hearth and the roof at a point adjacent the outer extremity of the hearth, and operative to conduct gas from said chamber to said space, separate passages communicating respectively with the inner end of each of said regenerator chambers operative to respectively conduct air or gas thereto and to conduct the spent gases of combustion therefrom, and a reversing valve controlling the direction of the flow of the gases through said chambers and over said hearth.

4. In a furnace, the combination with a double hearth, the sections of which are positioned consecutively longitudinally of the furnace and a roof above said hearth, of a pair of separate gas generator chambers beneath said hearth, a pair of air regenerator chambers also beneath said hearth, a flue leading from each of said gas and air regenerator chambers to a point adjacent an outer extremity of the superposed hearth, a plurality of separate passages extending transversely of the furnace each of said passages being arranged to communicate respectively with the inner end of one of said regenerator chambers, means to separately supply air and gas to said passages, and a reversing valve operative to control the direction of the passage of air and gas through said furnace.

In witness whereof, I have hereunto set my hand this 6th day of August, 1920.

WILLIAM H. STANTON.